United States Patent [19]

Guarriello et al.

[11] Patent Number: 4,972,963
[45] Date of Patent: Nov. 27, 1990

[54] BLOW MOLDED ARTICLE WITH REVERSE LIP

[76] Inventors: Henry J. Guarriello; Joseph A. Guarriello; Theodore J. Guarriello, all of 9 Woodland Rd., Newtown, Pa. 18940

[21] Appl. No.: 265,163

[22] Filed: Oct. 31, 1988

[51] Int. Cl.[5] .............................................. B65D 1/46
[52] U.S. Cl. .................................... 220/72; 215/1 C; 264/527; 264/531
[58] Field of Search .............. 264/531, 533, 534, 540, 264/527, 529, 536; 425/525, 527, 531, 532, 530; 215/1 C; 220/46, 4 E, 72; 47/66, 67

[56] References Cited

U.S. PATENT DOCUMENTS

| | | | |
|---|---|---|---|
| 2,828,789 | 4/1958 | Groendyk et al. | 47/66 |
| 3,934,747 | 1/1976 | Needt | 220/72 |
| 3,949,046 | 4/1976 | Procter | 264/296 |
| 4,170,623 | 10/1979 | Dubois et al. | 264/534 |
| 4,228,122 | 10/1980 | Hammes | 264/534 |
| 4,228,911 | 10/1980 | Hammes | 264/534 |
| 4,378,328 | 3/1983 | Przytulla et al. | 264/534 |
| 4,529,570 | 7/1985 | Przytulla | 264/534 |

FOREIGN PATENT DOCUMENTS

| | | | |
|---|---|---|---|
| 1540333 | 9/1968 | France | 215/1 C |
| 2093673 | 9/1982 | United Kingdom | 47/66 |

*Primary Examiner*—Jan H. Silbaugh
*Assistant Examiner*—Catherine Timm
*Attorney, Agent, or Firm*—Seidel, Gonda, Lavorgna & Monaco

[57] ABSTRACT

An apparatus and method for blow molding a recessed lip in a molded article. The apparatus includes two plates reciprocally movable toward and away from one another. A center ring member is fixedly and perpendicularly mounted on each plate. A mold half is mounted on each plate and is divided into two sections. One section is located on each side of the center ring member and is reciprocally movable toward and away from the center ring member. A first ring member is affixed to each section in proximity to the center ring member and has a channel. A second ring member is reciprocally movable in the channel and engages the center ring member. The recessed lip is molded between the center ring member, the first ring member and the second ring member.

3 Claims, 6 Drawing Sheets

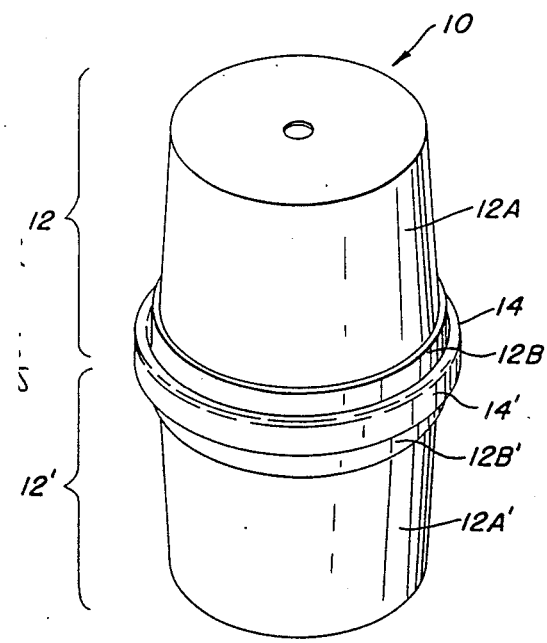
FIG. 1
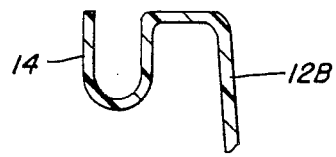
FIG. 3
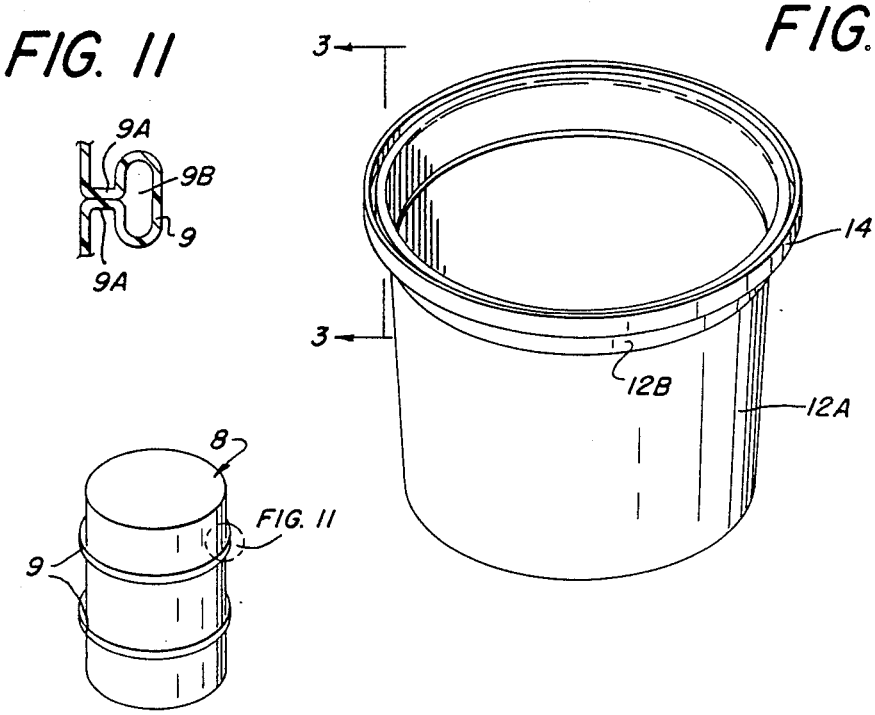
FIG. 11
FIG. 2
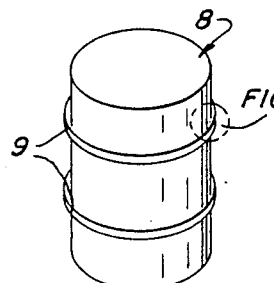
FIG. 10

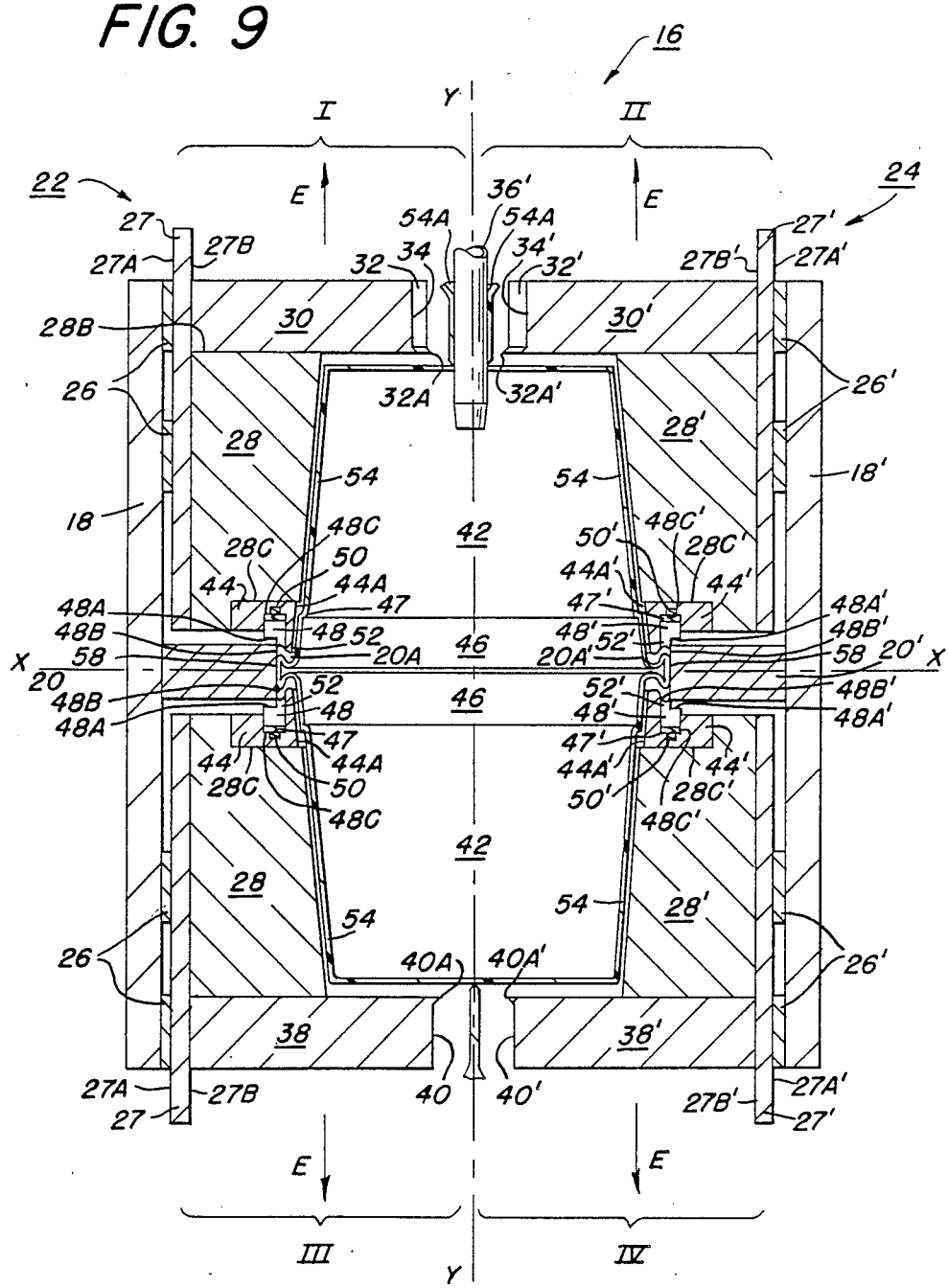

BLOW MOLDED ARTICLE WITH REVERSE LIP

FIELD OF THE INVENTION

The present invention is directed to blow molding plastic articles, and is specifically directed to a blow molding apparatus and method which forms a deep recessed or reverse lip in the article.

BACKGROUND OF THE INVENTION

The ability to mold a deep recessed lip, or reverse lip, into a plastic article has traditionally been achieved through the use of injection molding. For example, in order to obtain a deep recessed reverse lip on the rims of plastic containers, a manufacturer would inject, under pressure, molten plastic into an injection mold that defined the shape of the lip and container. Injection molding is an expensive and complicated process, because it requires a very large initial capital outlay for equipment and molds.

SUMMARY OF THE INVENTION

The present invention differs significantly from the injection molding method for forming a deep recessed lip in an article, in that it utilizes blow molding techniques. It provides the capability for producing an article with a sturdy reverse lip while eliminating the expense and complexity of injection molding.

The present invention is directed to an apparatus and method for blow molding a recessed lip in a molded article. The apparatus comprises two plates reciprocally movable toward and away from one another. A center member is fixedly and perpendicularly mounted on each plate. A mold half is mounted on each plate and is divided into two sections. One section is located on each side of the center ring member and is reciprocally movable toward and away from the center member. A first member is associated with each section in proximity to the center member and has a channel and a wall. A second member is reciprocally movable in the channel and engages the center member. The recessed lip is molded between the center member, the first member and the second member.

The method comprises the steps of providing a mold apparatus. The mold apparatus comprises a center member. A first member is located on either side of the center member includes a channel and a wall and is reciprocally movable toward and away from the center member. A second member is located in the channel and is reciprocally movable within the channel. The second member slidably engages the center member. A parison is extruded into the mold apparatus. The parison is sealed air tight in the apparatus. The parison is pressurized and a portion of the parison engages the center member and the second member. The first member is moved toward the center ring. The recessed lip is formed against the center member, the first member and the second member. The parison is depressurized and removed from the mold apparatus.

DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is an isometric view of an article, prior to separation, which may be molded according to the present invention.

FIG. 2 is an isometric view of an article, after separation and showing the recessed reverse lip, molded according to the present invention.

FIG. 3 is a sectional view taken along lines 3—3 in FIG. 2, showing the configuration of the recessed reverse lip.

FIGS. 4–9 are sectional views which illustrate the steps of the method and the operation and interrelationship of the apparatus.

FIG. 10 is an isometric view of an alternate article which may be molded according to the present invention.

FIG. 11 is an enlarged sectional view taken from FIG. 10, and illustrates a pair of reverse lips pinched together to form a rib.

DESCRIPTION OF THE INVENTION

Figure 4:
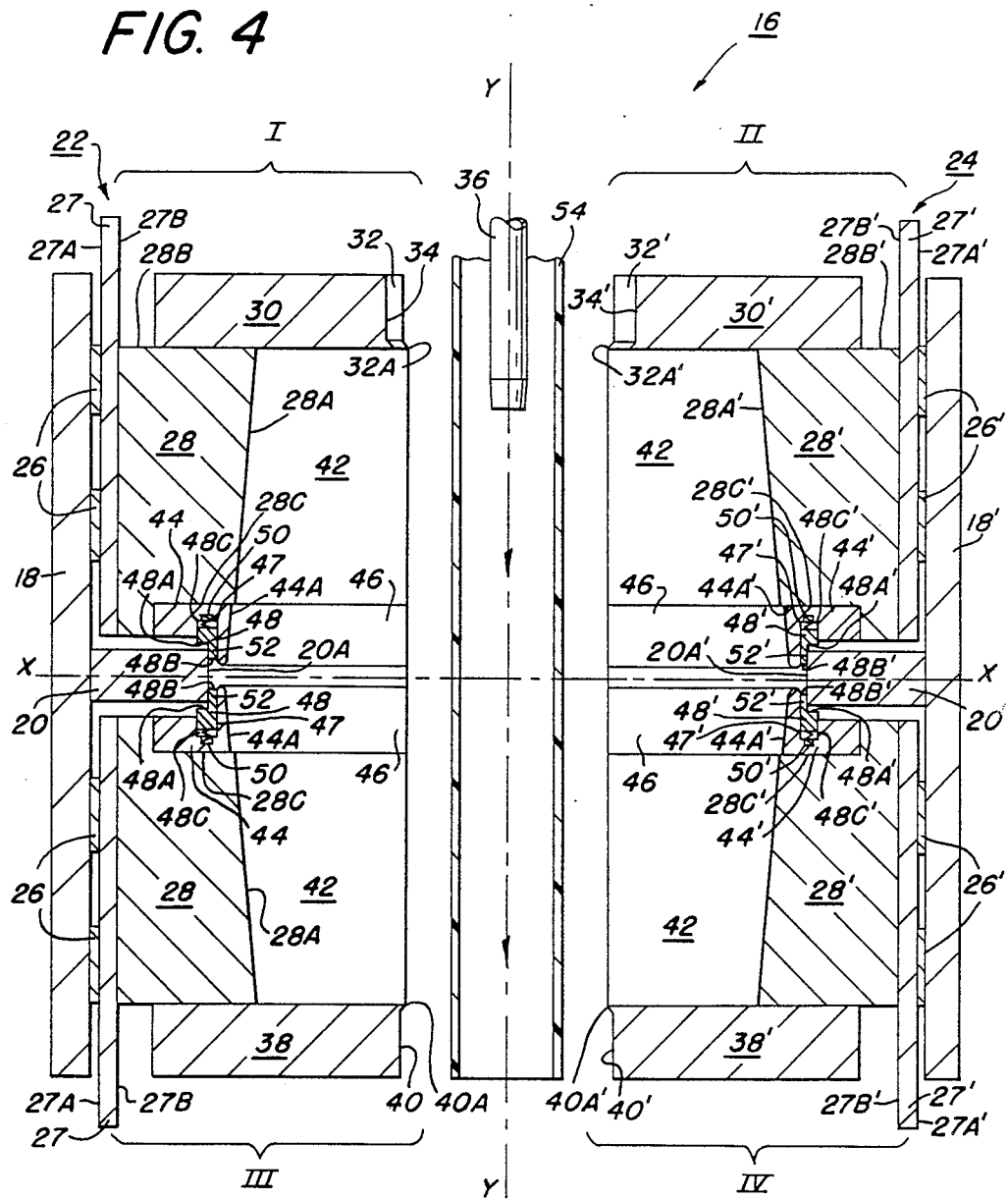

Referring now to the drawings, wherein like numerals indicate like elements, there is shown in FIG. 1 an article 10 which may be molded according to the present invention. Illustrated article 10 is, for example, two containers 12 and 12' which are simultaneously molded in a single molding operation (discussed below). The two containers are joined together at their respective recessed lips 14 and 14'. The two containers are separated, e.g. cut along a transverse plane substantially through the middle of molded article 10, at the joined lips 14, 14', such that containers 12 and 12' are of equal dimension after they are separated. FIG. 2 shows one of the two containers 12, after it has been separated. In FIG. 3, recessed lip 14 is shown in cross section. The term "recessed lip" or "reversed lip" refers to a generally U-shaped member which by its shape provides structural strength to the container. The lip may be, for example, $\frac{3}{8}"-1"$ in depth. An alternate article 8 made with the apparatus discussed hereinafter is illustrated in FIGS. 10 and 11. Article 8 is a drum having straight cylindrical walls and two ribs 9. One rib is illustrated in cross section in FIG. 11. Outwardly extending portions 9A of the rib are pinched together thereby sealing cavity 9B from the interior 8A of the drum. The seal prevents material from the inside of the drum from accumulating in cavity 9B. The rib adds strength to the drum and prevents the drum from bellying. The rib may also be used as a handle so that the drum can be picked up and moved, e.g. by a fork lift truck.

Mold apparatus 16, shown in cross section in FIG. 4, is a three dimensional structure capable of molding articles ranging in size from flower pots to garbage cans to 55 gallon drums. The specific mold apparatus shown in the figures produces a generally cylindrical flower pot with tapered walls, a closed bottom and the reversed lip formed around the opened top. The mold apparatus, however, is not limited to that geometry. The mold apparatus is meant to cover any geometry in which one may wish to provide a reverse lip or a number of reverse lips in a single article. One example of these geometries shown in FIGS. 1 and 2. Another example, FIGS. 10 and 11, is a 55 gallon drum which is cylindrical with straight walls and has four circumferential reversed lips. The mold apparatus could be used to mold articles of any cross section, by way of non limiting example, square, hexagonal, elliptical, triangular etc. Furthermore, the mold apparatus does not necessarily have to mold two containers, which are subsequently separated, single operation, instead a single article may be molded. Moreover, the top and bottom articles need not be symmetrical but can be different in size and shape. Accordingly, apparatus 16 should be envisioned as a block having a mold cavity therein for molding any articles in which a reverse lip is desired. The remaining discussion, however, will describe the apparatus and the process with regard to the article shown in FIG. 1.

Referring to FIG. 4, apparatus 16 comprises two horizontally reciprocally movable mold halves, left mold half 22 and right mold half 24, which are arranged symmetrically around a plane Y—Y. Mold half 22 is a mirror image of mold half 24. Each mold half is horizontally divided, by a plane X—X, into two vertically reciprocally movable sections. Mold half 22 comprises sections I and III, and mold half 24 comprises sections II and IV. When closed together, these sections define the shape of the article to be molded. Moving the sections apart allows the article to be released after it has been molded. The X—X and Y—Y planes divide apparatus 16 along its horizontal and vertical axis, respectively.

Only mold half 22 will be described in detail, as those skilled in the art will understand that the description applies equally well to mold half 24. A plate 18 is capable of horizontal reciprocal movement along plane X—X toward and away from its mirror image 18', but it is not vertically movable along the plane Y—Y. Center ring member 20 is affixed to plate 18 preferably equidistant from its ends. Center ring member 20 is arranged perpendicular to plate 18, that is, along X—X as viewed in FIG. 4. Surface 20A of ring member 20 is semicircular in the horizontal or X—X plane, so that when in contact with its mirror image 20', they define, in combination, a generally circular surface. Of course, if the mold apparatus is used to mold an article of square cross section, the surface 20A would have to define one half of the square surface.

Sections I and III of mold 22 are slidably mounted upon plate 18 via linear thrust bearings 26 for reciprocal movement in the vertical or Y—Y plane toward and away from center ring member 20. Sections I and III are arranged symmetrically around plane X—X and are disposed on either side of center ring member 20 as shown in FIG. 4. Section I is mirror image of section III except as noted below, and therefore only section I will be described in detail.

A mobile plate 27, having a surface 27A, rides on bearings 26. Mobile plate 27 is capable of reciprocal movement toward and away from ring member 20. Mold wall 28 is rigidly affixed to plate 27 along surface 27B. Plate 27 can be eliminated in which case mold wall 28 would be slidably mounted on the bearings. Surface 28A of mold wall 28 defines a substantially hemicylindrical but slightly tapered volume, so that when wall 28 is in contact with its mirror image 28', they define, in combination, a generally cylindrical but tapered volume. Of course, if a shape other than that described is desired, wall 28 would have to define that shape.

Pinch off plate 30 is movably affixed on an upper surface 28B of mold wall 28. Pinch off plate 30 is reciprocally movable, along the horizontal, or X—X plane, with respect to mold wall 28, toward and away from its mirror image 30' of section II. Pinch off plate 30 is substantially rectangular and has a hemicylindrical bore 32 along its inner surface 34 and includes pinch off edge 32A. The bore 32 in pinch off plate 30 cooperates with its mirror image bore 32' in the pinch off plate 30' to form a cylindrical bore which provides clearance for plastic flash from the parison and a blow tube 36 used in the molding process. Blow tube 36 can be eliminated as can the cylindrical bore, if known parison puncturing blow needles are used. Plates 30 and 30' are movable between a first position and a second position. In the first position (see FIG. 4) plates 30 and 30' are completely extended, i.e. spaced away from plates 27 and 27' respectively. When mold halves 22 and 24 are moved together (see FIG. 5) the mating pinch off edges 32A, 32A' form a tight seal about blow tube 36. (see the upper portion of the drawing in FIG. 5). In the second position (see FIG. 8), plates 30, 30' are in a completely retracted position, i.e. abutting plates 27 and 27' respectively.

Lower pinch off plates, 38, 38' of sections III, IV, respectively, do not require the bore 32 to provide clearance for blow tube 36. Pinch off plates 38, 38' instead comprise pinch off edges 40A and 40A', respectively. In addition, clearances 40 and 40' cooperate to provide clearance space for any excess portion of plastic which is extruded during the molding process. Lower pinch off plates 38 and 38' are movable between a first position and a second position. In the first position (see FIG. 4) plates 38 and 38' are completely extended, i.e. spaced away from plates 27 and 27' respectively. When mold halves 22 and 24 are moved together (see FIG. 5) the mating pinch off edges 40A, 40A' form a tight seal at the base of the mold. Any excess plastic is caught between clearances 40 and 40'. In the second position (see FIG. 8), plates 30, 30' are in a completely retracted position, i.e. abutting plates 27 and 27' respectively.

Mold walls 28, 28' and pinch off plates 30, 30' together define a frusto conical cavity 42 which, when brought together, defines the shape 12A of article 10. Of course, if a different shape is desired, the shape of the cavity must correspond to the desired shape.

First insert ring member 44 is affixed to wall 28 in a recess 28C in the proximity of center ring member 20. First insert ring member 44 may be formed as part of wall 28, instead of the discrete member illustrated. A wall 44A of first ring member 44 cooperates with mold wall 28 to define a second frusto conical cavity portion 46 which, when brought together, defines a circumferential shoulder 12B for the finished article 10. First insert ring member 44 is also provided with a channel 47 (see FIG. 6) into which is placed second insert ring member 48. First insert ring member 44 is preferably made of steel, but any metal with properties similar to those of steel will suffice.

Second insert ring member 48 is vertically reciprocally movable, i.e. in the Y—Y plane, within the channel 47 and is biased away from the interior of the channel by coil springs 50 (only one shown). Second insert ring member 48 is preferably made of bronze, but any metal having properties similar to those of bronze will suffice.

Second insert ring member 48 is L-shaped in cross section and is reciprocally slidable between a first position and a second position. Second insert ring member 48 has a shoulder 52 which slidably engages surface 20A of ring member 20. Spring 50 biases ring member 48 to the first position (see FIG. 4), i.e. out of channel 47, in which the shoulder 52 of ring member 48 bears against surface 20A. Spring 50 maintains second insert ring 48 at its first position until movement of mold section (note arrow B of FIG. 6) cause engagement of a surface 48A with center ring member 20. Since spring 50 maintains member 48 in its first position until engagement with ring member 20, parison 54 which engages concave surface 48B forms wrinkle 56. Spring 50 yields to forces, discussed below, applied against a surface 48A by center ring 20 (see FIG. 6) and allows ring member 48 to move to the second position (see FIG. 7) in which base 48C of ring member 48 abuts the bottom of channel 47.

Referring to FIGS. 4-9 in sequence, the operation of mold apparatus 16 will be described. Referring to FIG. 4, mold apparatus 16 is illustrated in its initial position. Upper mold sections I and II are separated from lower mold sections III and IV. In addition mold halves 22 and 24 are separated from each other. A parison 54, or a tube of plastic from an extruder (not shown), is extruded around blow tube 36, and between the mold halves 22, 24 of mold apparatus 16. The parison 54 may be polyethylene, however any thermoplastic which is blow moldable may be used. A polyethylene parison is typically extruded at a temperature of about 375° F. The temperatures and pressures set forth herein describe the process when polyethylene is blow molded. Temperatures and pressures suitable for other blow moldable thermoplastics are conventional and within the ordinary skill in the art.

Figure 5:
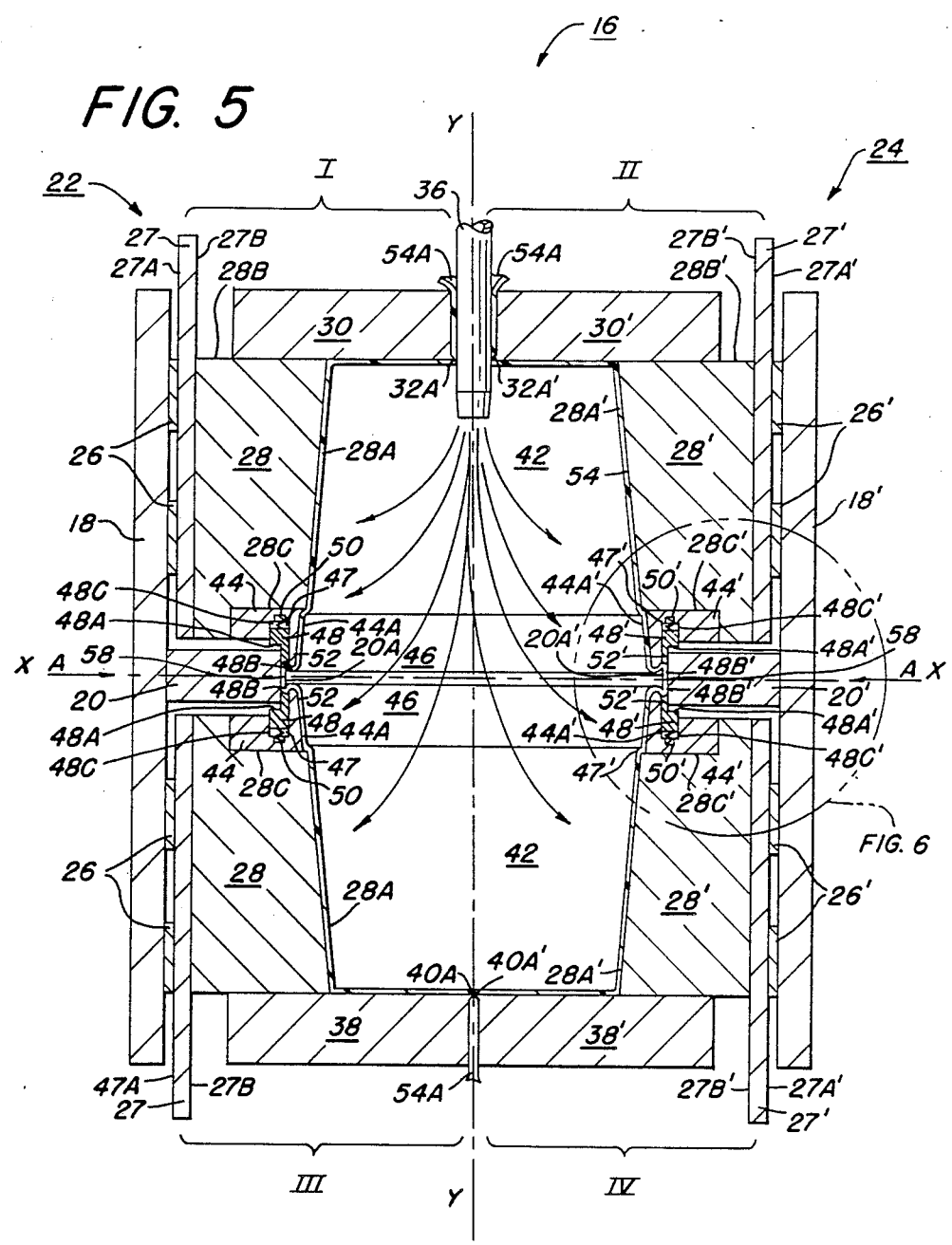

Referring to FIG. 5, the right and left mold halves, 22, 24 of mold apparatus 16 are moved together in the direction indicated by arrows A. Pinch off edges 32A, 32A' and 40A, 40A' seal the parison air tight and prepare the flash 54A of the parison 54 for easy removal. The section of parison 54 which is inside the mold 16 is then inflated or pressurized with air between about 60 and 150 psi so that the parison 54 is expanded and formed on the inner surface of the mold cavity. A portion 58 of the parison 54 is pushed out of the interior of the mold cavity and engages surfaces 20A and 48B. Thereafter the air pressure in the mold cavity may be lowered to about 5 to 40 psi. This depressurization of the parison is optional.

Figure 6:
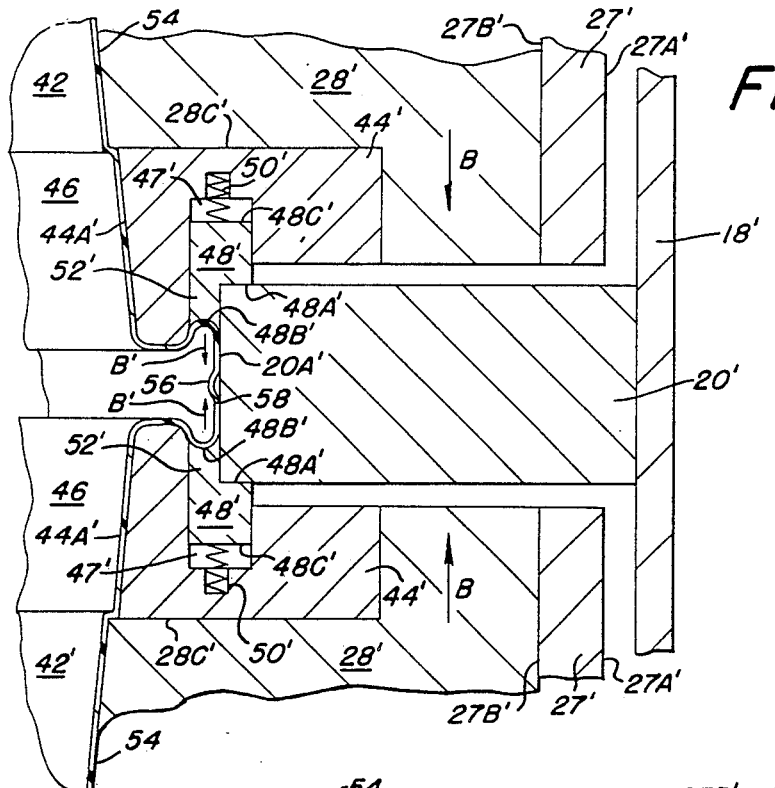

Referring to FIG. 6, which shows the right mold half 24, top mold section II and the bottom mold section IV are moved together in the direction indicated by the arrows B. As the mold sections are pushed together portion 58 is compressed in the direction shown by arrows B' and forms a wrinkle 56 because spring 50 will not yield to forces created by portion 58 against surface 48B. Further movement of the mold sections in the direction of arrows B forces surface 48A of second insert ring member 48 to engage ring member 20. Ring member 48 then moves into its second position and in doing so compresses spring 50. This movement causes portion 58 to slide against surface 20A and form against the curved surface 48B. If the article is not to separated across the upper and lower halves of the reversed lip (for example to form rib 9), walls 44A should be sufficiently tall so that when ring member 48 reaches its second position the parison there between is in contact and sealed or pinched together. When this is done, it may be necessary to puncture the reverse lip, with needles, to allow the escape of air pressure (not shown) and avoid explosion of rib 9.

Figure 7:
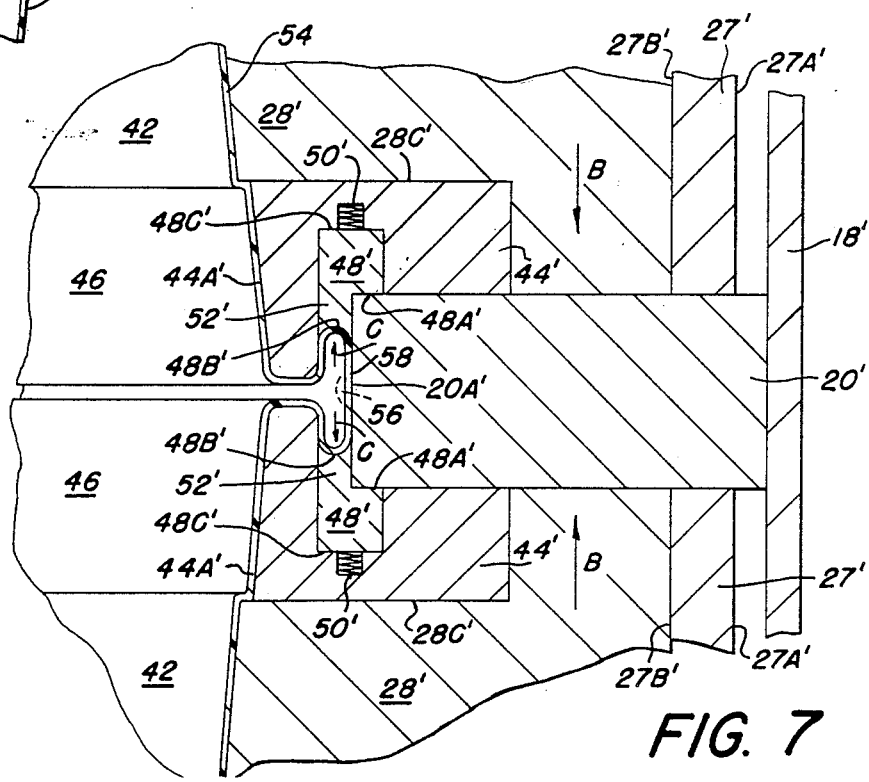

Mold sections II and IV continue moving in the direction indicated by arrows B until they are brought into full contact with ring member 20', see FIG. 7. The compression of second insert ring member 48 into channel 47 has made room for the portion 58 which has expanded in the direction shown by arrows C. Wrinkle 56, shown in phantom, has disappeared. At this time, air pressure of approximately 60 to 150 psi is returned, if the parison was previously depressurized, to the inside of the mold cavity and parison 54, to reform the part and speed the cooling process. The entire series of movements of the various mold sections described above happens rapidly, i.e. in less than 2 seconds.

Figure 8:
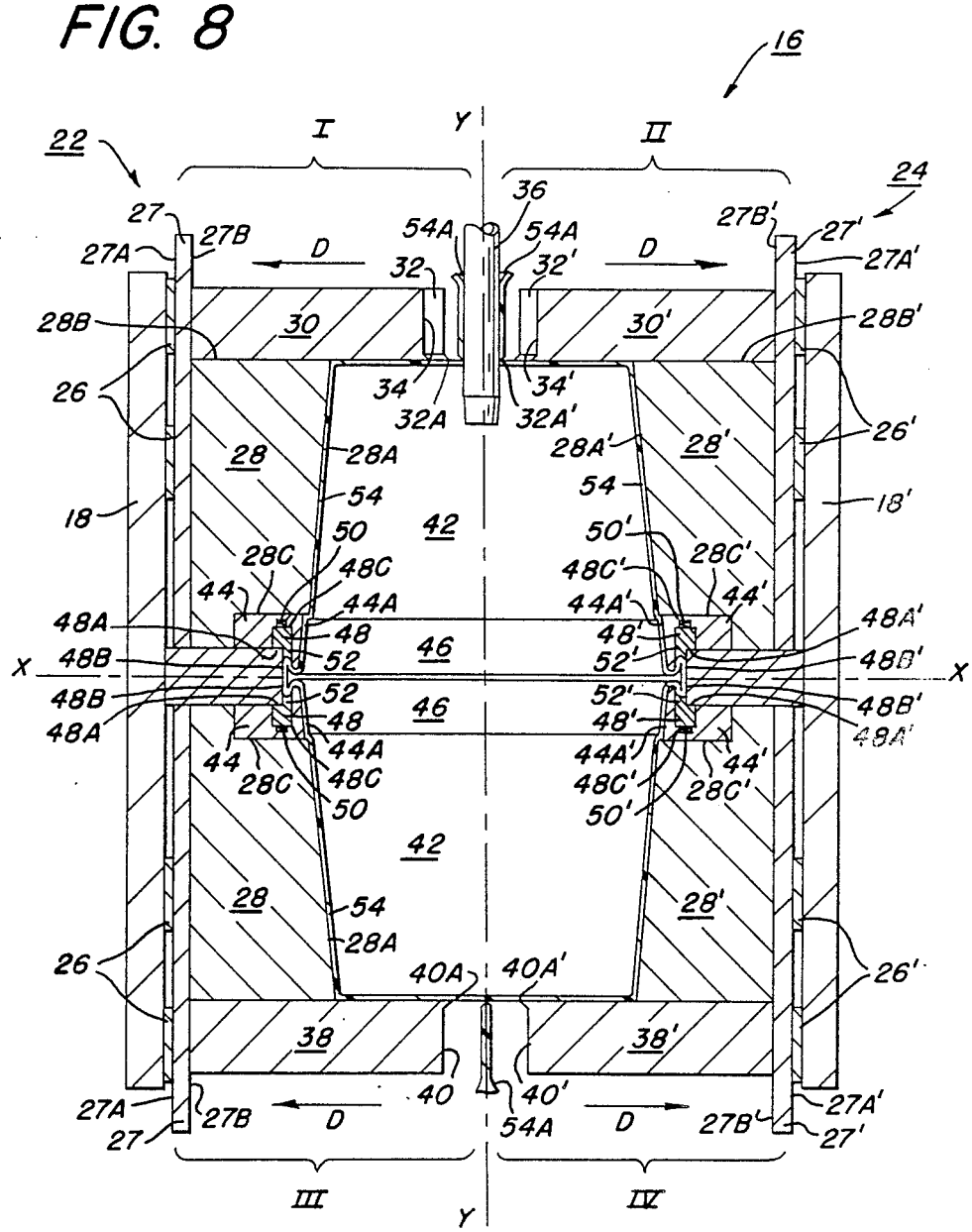

Referring to FIGS. 8 and 9, the parison 54 is depressurized and plates 30, 30' and 38, 38' are retracted in the direction indicated by arrows D into their second position, abutting plates 27, 27'. The mold sections are then separated as shown by arrows E and article 10 is removed therefrom.

The present invention may be embodied in other specific forms without departing from the spirit or essential attributes thereof and, accordingly, reference should be made to the appended claims, rather than to the foregoing specifications, as indicating the scope of the invention.

We claim:

1. An article produced by a method of blow molding a deep recessed portion onto a molded part comprising the steps of: providing a mold apparatus with two mold sections, each mold section comprising a center member, a first member on either side of said center member, said first members being reciprocally movable toward and away from said center member and having a channel therein and a wall, and a second member reciprocally movable within each said channel and biased toward and slidably engaging said center member; extruding a parison into said mold apparatus; closing said mold sections and sealing said parison air tight in said apparatus; pressurizing said parison in said apparatus and thereby forcing a portion of said parison into engagement with said center member and said second members, moving each said first member with said second number therein toward said center member to form a hollow body having at least one hollow recessed portion formed by the movement of the center member and the first and second members; depressurizing said hollow body; moving said mold sections away from one another; removing said hollow body from said mold apparatus, wherein said hollow body has at least one recessed portion which is symmetric with respect to a transverse plane through said hollow body; and sectioning the hollow body along said recessed portion so as to divide the hollow body into two pieces, each piece of the hollow body forming a said article and including at least part of said recessed portion such that each piece has a U-shaped cross-sectional portion spaced from said side wall and an outwardly extending flange portion projecting from said side wall where the hollow body was divided; said outwardly extending portion traversing the space between and joining said side wall to the U-shaped portion.

2. An article made using a blow molding process comprising: a bottom having a center axis; at least one side wall forming a symmetrical hollow body with respect to the center axis of said bottom; an open top; a recessed portion substantially U-shaped in cross-section formed around an outer periphery of the open top and spaced from said side wall, said recessed portion joined to said open top of said side wall by an outwardly extending web portion which projects from said outer periphery, the recessed portion forming a mechanical strengthening member for said article.

3. An article according to claim 2, wherein said article is made of a plastic material.

* * * * *